Dec. 13, 1955    I. F. HYDEN    2,727,223

FLOATING VERNIER SYSTEM

Filed Sept. 26, 1952    3 Sheets—Sheet 2

INVENTOR:
Irwin F. Hyden
His Patent Attorney

Dec. 13, 1955     I. F. HYDEN     2,727,223
FLOATING VERNIER SYSTEM
Filed Sept. 26, 1952     3 Sheets-Sheet 3
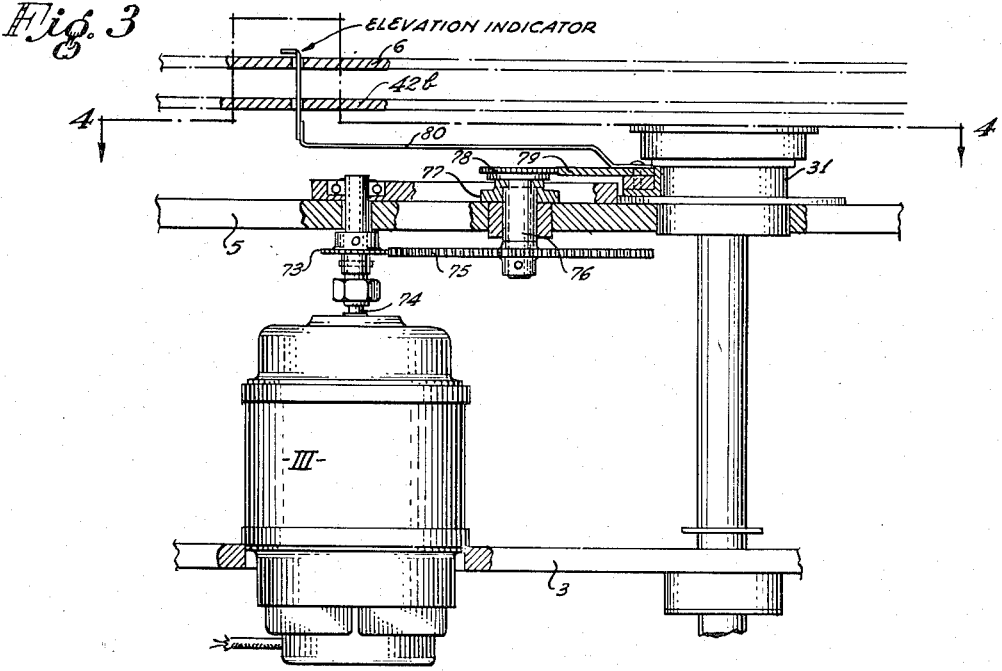
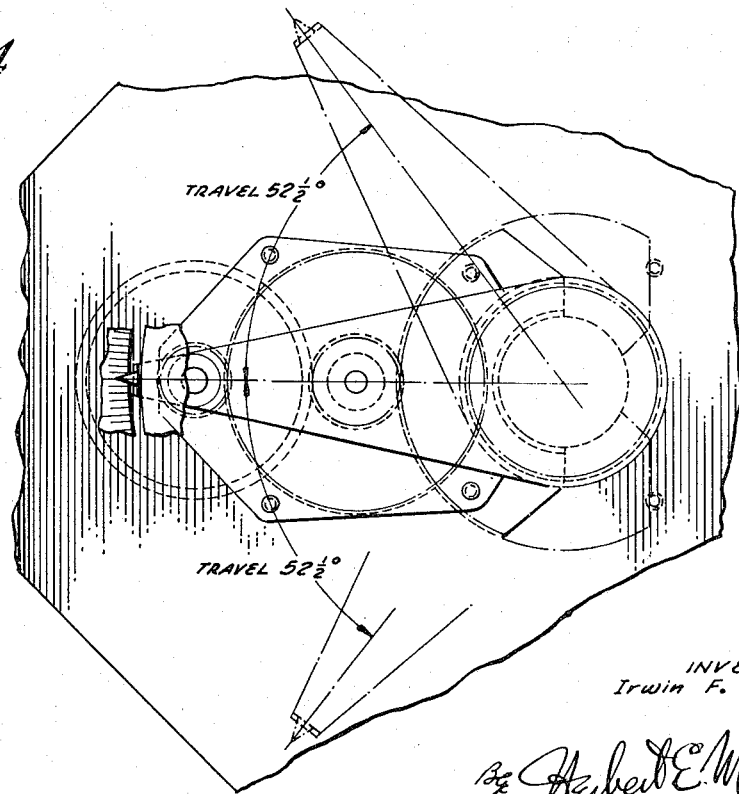
INVENTOR:
Irwin F. Hyden
His Patent Attorney United States Patent Office 2,727,223
Patented Dec. 13, 1955

2,727,223
FLOATING VERNIER SYSTEM

Irwin F. Hyden, Los Angeles, Calif., assignor to Northrop Aircraft, Inc., Hawthorne, Calif., a corporation of California Application September 26, 1952, Serial No. 311,657
9 Claims. (Cl. 340—201)

This invention relates to radar indicator units and particularly to indicator units arranged to show on a common dial data secured by pieces of equipment located at a distance therefrom.

In the long range radar tracking of aircraft from ground stations, for instance at distances of the order of 300 miles and upwards, it is necessary to provide greater accuracy and speed of reading than can be obtained by the use of known equipment sufficiently compact to be operated and read by a single observer.

It is an object of the present invention to provide indicator means giving accurate azimuth, range and beam elevation readings on a single dial although the instruments by which the information is obtained may be located at a distance.

Another object of the invention is to present the required information in a manner such that the observer is forewarned of the nature and/or time of change of signal to aid him in making rapid readings and observations, thus assisting materially in reducing reading error and fatigue.

A further object of the invention is to provide a vernier arrangement of azimuth indicating means enabling readings to be made with great accuracy and at high speed.

Still further objects and features of the invention will hereinafter appear from the following specification read in conjunction with the accompanying drawings which illustrate presently preferred embodiments of the invention.

With these and other objects in view, the invention comprises an indicator unit having superposed transparent dials suitably marked with or exposing indicator scales, some of which may be read in conjunction with others, and others which may be directly read or read through the transparent dials, the arrangement being such that readings of direction, distance and elevation of an object being tracked may be accurately and rapidly read by a single observer because of the minimum distance required for eye travel from one scale to another and the aid given the observer's eye in locating the point on the scale requiring observation.

In the drawings:

Figure 3 is a cross section on the line 3—3 of Figure 1;

Figure 4 is a fragmentary view, drawn on a larger scale, of elevation indicating mechanism.

Figure 2:
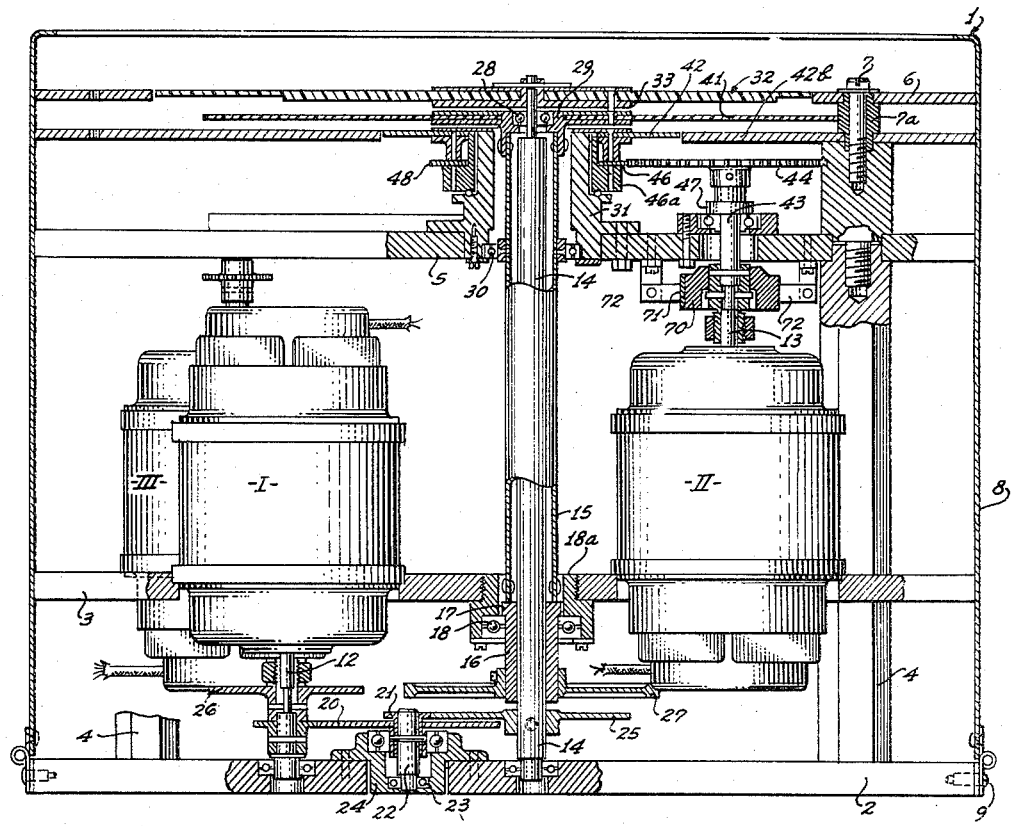
Figure 2 is a cross section on the line 2—2 of Figure 1.

As best shown in Figure 2, the device is mounted in a rectangular case 1 comprising a base plate 2, a lower plate 3 supported by sectional spacers 4 secured on the base plate, an upper plate 5 also mounted on the spacers 4, and a top plate 6 resting on the spacers and secured thereto by studs 7 and eccentrically turned caps 7a which enable accurate adjustment of the top plate to be made. Side walls 8 secured to the base 2 by screws 9 enclose the mechanism of the device.

Three synchro motors I, II and III are mounted vertically on lower plate 3, motor I with its shaft directed downward, and motors II and III with their shafts upward.

An inner centrally positioned vertical shaft 14 is supported at its lower end in a bearing in the base 2 and an outer tubular shaft 15 is mounted on and secured toward its lower end to a sleeve 16 closely fitting around shaft 14 and formed with an annular shoulder 17 resting on a ball bearing 18 supported in a bearing sleeve 18a screwed into plate 3.

The inner shaft 14 is rotated by motor I through a gear 19 pinned on motor shaft 12 which meshes with gear 20 secured together with gear 21 on a lay shaft 22 supported in anti-friction bearings 23 carried in a bearing sleeve 24 mounted in base 2. Gear 21 meshes with a gear 25 pinned to shaft 14.

Tubular shaft 15 is rotated at a speed in the ratio of 16:9 to the speed of rotation of shaft 14 through gear 26 which meshes with an idler gear assembly (not shown) which in turn drives a gear 27 pinned on sleeve 16.

The upper end of shaft 14 is journalled in antifriction bearings 28 mounted within the hub of a disk-like mounting member 29 mounted on the upper end of the tubular shaft 15, which latter shaft is itself journalled toward its upper end in antifriction bearings 30 mounted in a bearing member 31 secured on the upper face of upper plate 5.

Figure 1:
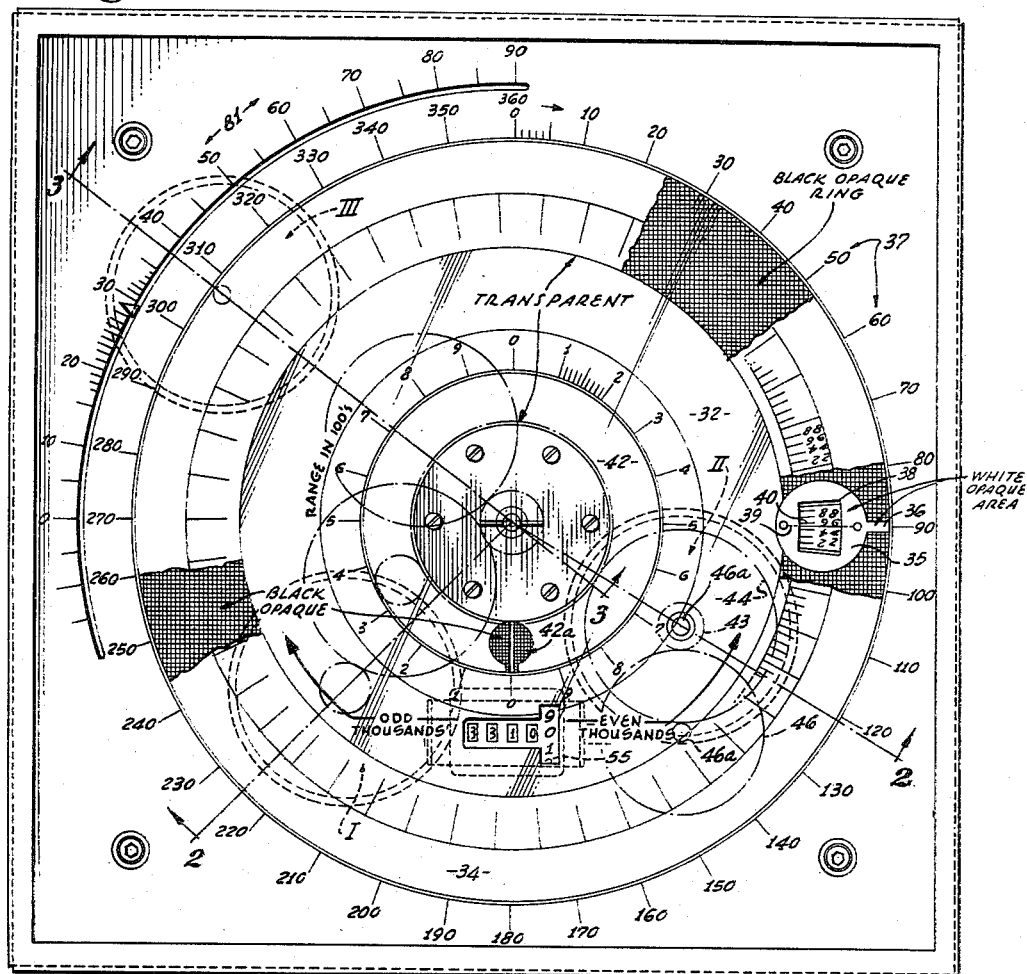
Figure 1 is a top plan view of the indicator unit, with parts broken away to show underlying parts, and with some mechanism omitted for clarity.

Shafts 14 and 15 carry the azimuth indicator and vernier therefor as shown in Figure 1. The azimuth pointer is formed on a transparent disc 32 arranged in a circular opening in top plate 6 and secured to a mounting member 33 pinned to the upper end of shaft 14. Disc 32 is provided around its outer edge with an opaque black band 34 interrupted at one point by a large white spot 35 with a pointer or strip 36 leading from midway of the spot to the edge of the disc. The pointer 36 reads against a scale 37 marked in degrees from zero to 360, the marks running clockwise around the edge of the opening in which the disc is mounted.

The vernier scale of the azimuth indicator is viewed through an arcuate clear area 38 in the center of the white spot, a stainless steel wire 39 being stretched across the clear area to act as a hair line.

The vernier scale 40 is marked around the circumference of a transparent disc 41 secured to mounting member 29, the scale being divided into 45 equal divisions each of which is divided into five equal spaces by lines numbered 2 to 8.

The speed of rotation of shafts 14 and 15 is such that the vernier disc rotates $\frac{1}{45}+\frac{1}{360}$ or 1 subdivision of the vernier scale for each $\frac{1}{360}$ of a turn of the azimuth disc, thus enabling a reading to be made to the nearest $\frac{1}{10}$ of a degree. The vernier scale is said to be floating in the system, since a vernier reading is given at any position of the azimuth indicator. The decimal additive is applied to the reading of the main scale by reading the figure on the vernier scale which is located under the wire 39.

The range indicator dial 42 is driven by synchro motor II, the shaft 13 of which is axially coupled to a shaft 43 which projects through plate 5 and has a gear 44 (Figure 1) pinned thereto, which drives a gear 46 (Figure 2) mounted on a sleeve 46a on which the dial 42 is mounted and which is rotatable on bearing member 31.

The range indicator dial 42 is viewed through both the transparent discs of the azimuth dial 32 and the vernier dial 41. The dial 42 carries a pointer 42a formed as a large black dot with a bright wire extending diametrically across it, which reads against a scale marked around a cut out in a plate 42b mounted below plate 6 and reading clockwise from zero to 10 in each half circle.

Figure 5:
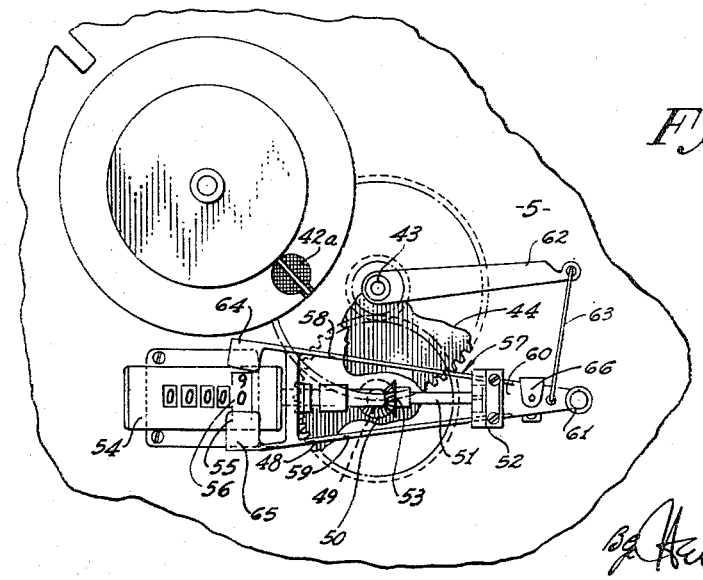
Figure 5 is a detail view of range counting mechanism.

A small gear 47 is mounted on shaft 43 below gear 44 and meshes with a gear 48 (Figure 5) mounted on a stub shaft 49 supported on plate 5.

A bevel gear 50 (Figure 5) is mounted on shaft 49 and transmits drive from shaft 43 to a counter assembly.

The counter assembly comprises a horizontal shaft 51 mounted in bearings 52 on plate 5 and having a bevel gear 53 secured thereon meshing with bevel gear 50. Shaft 51 operates an "add-subtract" Veeder root decimal counter 54, with a 5 to 1 ratio. The first drum 55 of the counter has ten digits per turn of the input shaft, each representing 100 yards so that the counter tallies the range in terms of thousands of yards. The range indicating scale and counter are clearly viewed through the transparent areas of the azimuth and vernier discs.

The counter case is cut out as shown at 56 to show three numerals on input drum 55. A flag device 57 is provided and arranged to expose the figure next coming up on the counter so that the observer will know whether the range is increasing or decreasing. The flag device comprises a pair of arms 58, 59, secured to a base member 60 which is pivoted at 61 to plate 5. The arms are swung in one direction or the other by an arm 62 mounted to be in frictional engagement with the felt-covered surface of gear 44 and is connected by a link 63 to arm base member 60. The result of the described arrangement is to swing the arms 58, 59 horizontally in one direction or the other, according to the direction of rotation of gear 44, which requires only a very small arc of rotation of the gear because of the length of the lever arm provided between pivot 61 to the point of connection of link 63 to the distance between that point and the outer ends of the arms 58, 59. The movement of the arms brings either small plate or flag 64 mounted on the end of the arm 58, or 65 mounted on arm 59, into position to obturate one or the other of the additional numerals. Accurate positioning of the flags is insured by a stop 66 positioned on plate 5 to limit the movement of the arms.

The range is accurately read by noting the number indicated by counter 54, which will give the range in thousands of yards only and will also show whether the range is increasing or decreasing by observing whether the figures coming into view on the first drum are increasing or decreasing and then noting the reading on the pointer 42a on the range scale which is marked off for each ten yards.

The range scale is marked in 1000 yards per half turn, the scale figures indicating hundreds of yards, and the counter makes one-tenth of a turn or 1 digit for each one-half turn of the range pointer, so that if pointer 42a is moving clockwise over the lefthand half of the scale the observer knows that the range is increasing toward an even number of yards, for instance, traveling from 101,000 to 102,000 yards, while, if the pointer continues to travel clockwise, he will hear an audible signal indicating that the range has become 102,000 yards and that the pointer is moving toward 103,000 yards and vice versa for the counterclockwise movement of pointer 42a.

A commutator or rotary contact member 70 having a single contact bar 71 may be secured on the shaft 43 driven by the range indicator driving synchro motor II, and brushes 72 may be arranged to contact with said bar and connected in a siutable electric circuit to give the desired signal and to transmit data to recording or signal transmitting equipment if required.

The signal may consist of a short tone which will be obtained at each half revolution of the range counter dial 42, so that the observer knows that the range in thousands of yards remains the same and can give his attention to watching the scale giving the additional range figures in units of ten yards. A tone will indicate that the range has changed by one thousand yards and warn him to note the change of range in thousands of yards.

A beam elevation indicating unit, incorporated in the indicator and driven by synchro motor III, is shown in Figures 3 and 4. A pinion 73 is mounted on the shaft 74 of motor III and engages with a gear 75 on a stub shaft 76 mounted in and extending through plate 5, and journalled in a bearing 77 in said plate. A pinion 78 mounted on shaft 76 engages with and drives a segmental gear 79 mounted on bearing member 31. A pointer 80 is secured to segmental gear 79 and extends horizontally below plate 42b, is then bent vertically to pass through arcuate slots in both plates 42b and 6, and the end of the pointer is bent horizontal to read against a scale 81 (Figure 1) marked in degrees reading from −15° to +90°.

The zero mark of the elevation scale is placed in line with the 270° mark of azimuth scale and the 90° mark in line with the zero mark of the azimuth scale.

It is to be understood that the signals or data indicated by the device are furnished by suitable separately located and independently operated equipment which signals are fed into the individual synchro motors, as is well understood in the art.

The reading of the indications furnished by the device is readily effected with minimum delay and maximum freedom from strain on the observer, and with a high degree of accuracy.

For instance, in reading the azimuth scale the observer's eye is attracted by the white spot in the black band around the dial, and tenths of a degree are shown clearly through the clear space in the white spot and appear below the hair line extending across the clear space.

Similarly the observer is aided in reading the range counter and determining whether range is increasing or decreasing by the provision of the shutter unit in combination with the exposure of additional numerals on the first drum of the counter and the audible signal warning the observer of a change of 1000 yards in range.

In experimental use and test it has been found possible for a data operator to accurately read range, azimuth and beam elevation data in approximately 10 seconds, while maximum indicating error has been measured at 1/16 of a degree.

While in order to comply with the statute, the invention has been described in language more or less specific as to structural features, it is to be understood that the invention is not limited to the specific features shown, but that the means and construction herein disclosed comprises a preferred form of putting the invention into effect, and the invention is therefore claimed in any of its forms or modifications within the legitimate and valid scope of the appended claims.

What is claimed is:

1. A remote indicator unit, comprising: a plurality of superposed co-axially arranged transparent discs rotatably mounted in the unit, an upper disc being provided with a pointer; an azimuth scale around said upper disc and against which said pointer reads; a vernier scale marked on a disc mounted directly below and read through said upper disc; and driving means operated by signals from instruments spaced from said unit and rotating said upper disc and the disc carrying said vernier scale at different speeds such that a vernier reading is provided below the reading indicated by said upper disc at any position thereof.

2. Apparatus in accordance with claim 1 and in which the upper transparent disc is provided with a circumferentially arranged opaque band provided with a clear area, a hair line extending radially across said clear space; and a pointer in alignment with said hair line reading against the azimuth scale.

3. A remote indicator unit comprising a plurality of superposed co-axially arranged transparent discs rotatably mounted in the unit; an upper disc provided with a pointer; an azimuth scale around said upper disc and against which said pointer reads; a floating vernier scale marked on a lower disc mounted directly below and read through said upper disc; an elevation scale adjacent the azimuth scale; a pointer reading against said elevation scale; and driving means operated by signals from distant instruments and rotating said upper and vernier discs and said elevation pointer at predetermined speeds, said upper and vernier discs being rotated at different speeds.

4. A remote indicator unit comprising a plurality of superposed and co-axially arranged rotatable discs, a casing in which said discs are mounted; centrally arranged co-axial vertical driving shafts rotating an upper pair of discs at different speeds; an azimuth scale marked on structure around the uppermost of said pair of discs and reading from zero to 360° around the uppermost disc, said pair of discs in combination with said scale affording a vernier azimuth reading; an arcuate slot in the structure on which said azimuth scale is marked and concentric with said upper disc; and an elevation scale marked on said structure along the edge of said slot and marked clockwise from −15° to +90°, the zero of said elevation scale being located in alignment with the 270° mark of the azimuth scale and the 90° mark of the elevation scale being aligned with the zero mark of the azimuth scale.

5. A remote indicator unit comprising a plurality of superposed co-axially arranged transparent discs rotatably mounted in the unit; an upper disc provided with a pointer; an azimuth scale marked on structure around an upper disc and against which said pointer reads; a floating vernier scale marked on a lower disc mounted directly below and read through said upper disc; a range counting device mounted below and read through the upper and lower discs, said counting device tallying the range in large units; a range disc arranged below the lower transparent disc and provided with a pointer; a scale marked on structure surrounding said range disc and against which said pointer reads to indicate subdivisions of the smallest unit indicated by said range counting device, said range scale marked and numbered from zero to ten clockwise in two consecutive semi-circles around the range disc, the space between the markings being divided by marks to indicate subdivisions of the range indicated by the numerals; and driving means operated by signals from distant instruments and rotating said upper and vernier discs, and said range counting device and the range disc at predetermined relative speeds.

6. A remote indicator unit as set forth in claim 5 in comprising an electrical circuit, contacts in said circuit operated by the driving means rotating said range disc; and signal means controlled by the operation of said contacts to indicate changes of range in predetermined units.

7. A remote indicator unit as set forth in claim 6 and in which said contact means are arranged to be operated at each half revolution of the range disc to indicate a change in range corresponding to a change in the smallest reading of the range counting device.

8. A remote indicator unit as set forth in claim 5 comprising a casing; counting mechanism having a plurality of drums carrying numerals on their edges mounted co-axially in the casing, which is provided with a slot to expose a single line of said numerals on all but the unit drum of said counting mechanism, the slot over the unit drum being widened to expose more than two of the numerals thereon.

9. A remote indicator unit as set forth in claim 8 and in addition comprising an obturating device; a friction driven connection between said obturating device and the driving means of the counting device so that, depending on the direction of rotation of the driving means, only one numeral is exposed in addition to the numeral shown in alignment with the numerals carried by the remainder of the drums.

References Cited in the file of this patent
UNITED STATES PATENTS

| Number | Name | Date |
| --- | --- | --- |
| 1,356,505 | Sperry | Oct. 19, 1920 |
| 1,724,432 | Sperry, Jr. | Aug. 13, 1929 |
| 1,850,640 | Sperry et al. | Mar. 22, 1932 |
| 1,862,489 | Chafee | June 7, 1932 |
| 2,172,450 | Pitcher | Sept. 12, 1939 |
| 2,296,032 | Hammond, Jr. | Sept. 15, 1942 |